(12) United States Patent
    Hollis

(10) Patent No.: US 9,893,975 B2
(45) Date of Patent: Feb. 13, 2018

(54) IN-LINE NETWORK TAP

(71) Applicant: Microsoft Technology Licensing, LLC, Redmond, WA (US)

(72) Inventor: William K Hollis, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 14/750,900

(22) Filed: Jun. 25, 2015

(65) Prior Publication Data

US 2016/0380868 A1    Dec. 29, 2016

(51) Int. Cl.
| H04L 12/26 | (2006.01) |
| H04L 12/931 | (2013.01) |
| H04L 29/06 | (2006.01) |
| H04L 12/801 | (2013.01) |

(52) U.S. Cl.
CPC ............ *H04L 43/12* (2013.01); *H04L 43/062* (2013.01); *H04L 47/10* (2013.01); *H04L 49/40* (2013.01); *H04L 63/00* (2013.01)

(58) Field of Classification Search
None
See application file for complete search history.

(56) References Cited

U.S. PATENT DOCUMENTS

| 6,876,667 | B1 | 4/2005 | Synnestvedt et al. |
| 7,092,604 | B2 | 8/2006 | Edwards et al. |
| 7,227,889 | B1 | 6/2007 | Roeck et al. |
| 7,352,289 | B1 | 4/2008 | Harris |
| 7,617,314 | B1 * | 11/2009 | Bansod ............... H04L 43/026 709/224 |
| 8,233,804 | B2 | 7/2012 | Aguren |
| 8,498,541 | B2 | 7/2013 | Hosking |
| 8,848,699 | B2 | 9/2014 | Gambardella et al. |
| 8,947,258 | B2 | 2/2015 | Pant et al. |
| 2004/0215832 | A1 | 10/2004 | Gordy et al. |
| 2006/0008210 | A1 * | 1/2006 | Cornell ............... G02B 6/2804 385/48 |

(Continued)

FOREIGN PATENT DOCUMENTS

| WO | 2009147652 A2 | 12/2009 |
| WO | WO2011023944 | 3/2011 |

OTHER PUBLICATIONS

"Network Monitoring from the Inside out: Network Taps vs. Mirror Ports", Retrieved on: Apr. 14, 2015 Available at; https://www.blackbox.com/resource/genpdf/Network-Taps.pdf.

(Continued)

*Primary Examiner* — Chi H Pham
*Assistant Examiner* — Vladislav Agureyev
(74) *Attorney, Agent, or Firm* — Workman Nydegger

(57) ABSTRACT

An in-line network tap includes a network tap chip that is configured to analyze or otherwise process data packets as the data packets are transmitted within a network. The network tap chip can be embedded within a communication cable, such as an Ethernet or USB cable, either within the flexible cable portion of the cable or within a connector on either end of the communication cable. Alternatively, the network tap chip can be embedded within a transceiver. The in-line network tap can perform various processing including monitoring network performance, facilitating remote troubleshooting, data buffering, and intrusion detection and prevention.

19 Claims, 12 Drawing Sheets

(56) References Cited

U.S. PATENT DOCUMENTS

| | | | |
|---|---|---|---|
| 2007/0081553 A1* | 4/2007 | Cicchetti | H04L 12/10 370/466 |
| 2007/0260933 A1* | 11/2007 | Siu | H04L 43/18 714/39 |
| 2008/0075103 A1* | 3/2008 | Noble | H04L 12/2697 370/429 |
| 2010/0125661 A1 | 5/2010 | Perala et al. | |
| 2012/0030394 A1 | 2/2012 | Bird | |
| 2013/0201316 A1 | 8/2013 | Binder et al. | |
| 2014/0022891 A1* | 1/2014 | Matityahu | H04L 43/12 370/225 |
| 2014/0205282 A1 | 7/2014 | Myong et al. | |
| 2016/0259005 A1* | 9/2016 | Menon | G01R 31/3177 |

OTHER PUBLICATIONS

"PowerFlex 755 Drive Embedded EtherNet/IP Adapter", Published on: Oct. 2013 Available at: http://literature.rockwellautomation.com/idc/groups/literature/documents/um/750com-um001_-en-p.pdf.

"International Search Report and Written Opinion Issued in PCT Application No. PCT/US2016/037950", dated Sep. 16, 2016, 12 Pages.

"International Preliminary Report on Patentability issued in PCT Application No. PCT/US2016/037950", dated Jul. 12, 2017, 6 Pages.

\* cited by examiner

IN-LINE NETWORK TAP

BACKGROUND

A network tap can be connected to a network switch and used to monitor and perform diagnostics on a network. Existing network taps are implemented as a separate hardware device that requires a direct power supply. When connected to the network, the device obtains a new Internet Protocol (IP) address and Media Access Control (MAC) address to enable the device to communicate with a monitor or diagnostics operator. Because existing network taps are implemented as separate devices, they are easily detectable. Furthermore, MAC address locking or IP address locking can prevent a network tap from communicating over the network.

SUMMARY

An in-line network tap implemented as part of a transceiver or as part of a communication cable is configured to detect, monitor, and process data packets being transmitted from one device to another. The in-line network tap can support, for example, network performance monitoring, data buffering, intrusion detection and prevention, and troubleshooting.

The in-line network tap may provide various technical effects, including ease of configuration because it may be built into a network cable or other device. Similarly, to the extent an in-line network tap is built into a device, it may not require a separate power supply. It may be useful in size constrained scenarios, such as within a data center, personal computer scenario, or any other scenario where a limited number of items within a constrained space are desired. In addition, the amount of power required for a chip may be small compared to power for a separate device, which increases energy efficiency. This is especially true if the network tap uses power supplied to the destination device. Still further, it may allow for activities such as network performance monitoring, troubleshooting, intrusion detection to be configured and performed with minimal setup and configuration on the part of the user. Further still, if the in-line network tap uses the internet address of a device it is attached, it may also reduce network planning and configuration requirements since different addresses do not need to be provisioned, managed or configured.

Privacy of user data may be ensured by attaching labeling to a network cable to make clear that it includes a network tap within it. In addition, the network tap may (or may not) include a physical switch to allow a user to switch off any network activities by the tap chip. Still further, the network tap chip may be switched off, disabled, or placed into a suitable debug mode by using a wireless signal to control the settings of the network tap chip. Further, the network chip may be configured to only perform debugging or troubleshooting functions—as just one example, it may be configured to only look at low level data and not application level data. In addition, it may be configured to switch off the network tap chip if application level data is not encrypted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the drawings to reference like features and components.

DETAILED DESCRIPTION

The following discussion is directed to an in-line network tap. As described herein, an in-line network tap can be implemented as network tap circuitry, such as a chip or a printed circuit board, embedded within a transceiver or communications cable. For example, the network tap circuitry can be embedded within a transceiver, an Ethernet cable, a universal serial bus (USB) cable, or a USB Type C cable.

The network tap circuitry within the transceiver or communications cable uses power from a device to which the transceiver or communications cable is connected. In an example implementation, the network tap circuitry also senses and takes on the Media Access Control (MAC) address and Internet Protocol (IP) address of the device to which the transceiver or communications cable is connected. The network tap circuitry may by preprogrammed for specific monitoring and/or diagnostic functions. Alternatively, the network tap circuitry may communicate with a remote command and control system to receive monitoring and diagnostic instructions.

The in-line network tap described herein provides many benefits over traditional network tap implementations. For example, the in-line network tap does not change the physical configuration of the network, which is beneficial when troubleshooting. That is, the in-line network tap is implemented as network tap circuitry physically embedded within the network hardware, such as, within a transceiver or a communications cable. As another example, when the network tap utilizes the MAC address and IP address of a device to which it is connected, communications from the network tap are not disrupted by MAC address locking or IP address locking. The in-line network tap can support communication between devices by buffering data for later transmission when a receiving device is temporarily overloaded. Furthermore, in addition to monitoring and diagnostic roles, the in-line network tap can serve an active role in performing both intrusion detection and intrusion prevention. The in-line network tap in communication with a remote command and control system also enables remote troubleshooting.

Figure 1:
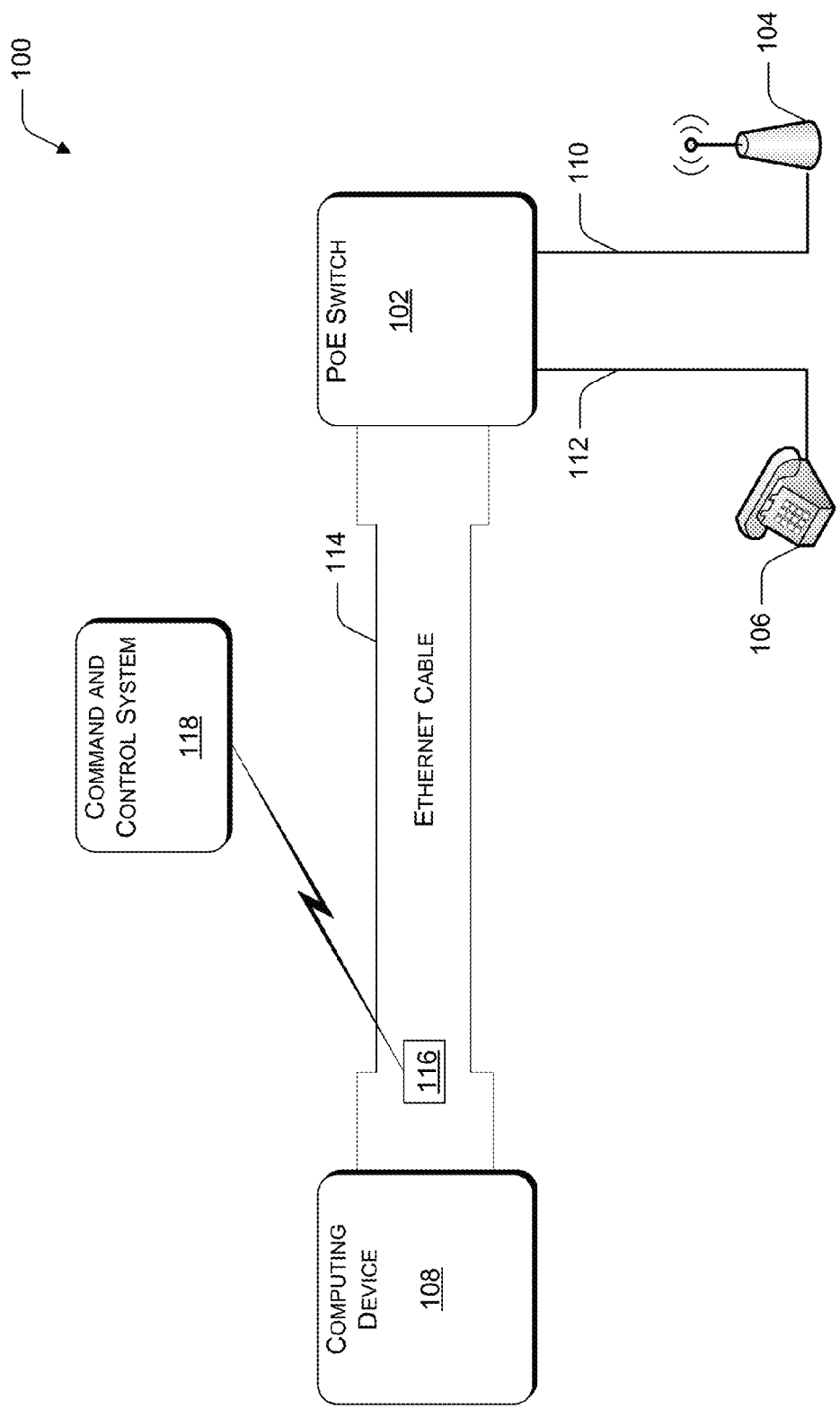
FIG. 1 is a block diagram illustrating an example environment in which an in-line network tap can be implemented as an Ethernet cable.

FIG. 1 illustrates an example environment 100 in which an in-line network tap can be implemented as an Ethernet cable. Example environment 100 includes a Power over Ethernet (PoE) switch 102, which serves as a central connection point for each device on an Ethernet network. The PoE switch passes both data and electrical power over Ethernet cabling to any number of devices. In the illustrated example, the Ethernet network includes a wireless access point 104, a telephone 106, and a computing device 108. The illustrated Ethernet network is merely illustrative, and represents an Ethernet network that can include any number of devices connected to the Ethernet switch 102. Each device on the Ethernet network is connected to the PoE switch 102 with an Ethernet cable, such as Ethernet cables 110, 112, and 114. In the illustrated example, Ethernet cable 114 includes a network tap chip 116. Accordingly, Ethernet cable 114 serves as an in-line network tap. Any number of devices on the network may be powered by the PoE switch using electrical power that is transmitted over the Ethernet cable. For example, the wireless access point 104 may not include a separate power source, but instead may be powered by electrical power received from PoE switch 102 over Ethernet cable 110. Similarly, network tap chip 116 may be powered by electrical power received from PoE switch 102 over Ethernet cable 114.

In the illustrated example, network tap chip 116 communicates with command and control system 118 to receive instructions and to provide monitoring and diagnostic data. In an example, network tap chip 116 includes a wireless network interface controller, which allows network tap chip 116 to communicate with command and control system 118 at least partly over a wireless network. For example, network tap chip 116 may connect to a remote command and control system 118 via any open Wi-Fi network or via a Wi-Fi network using previously supplied security credentials.

Figure 2:
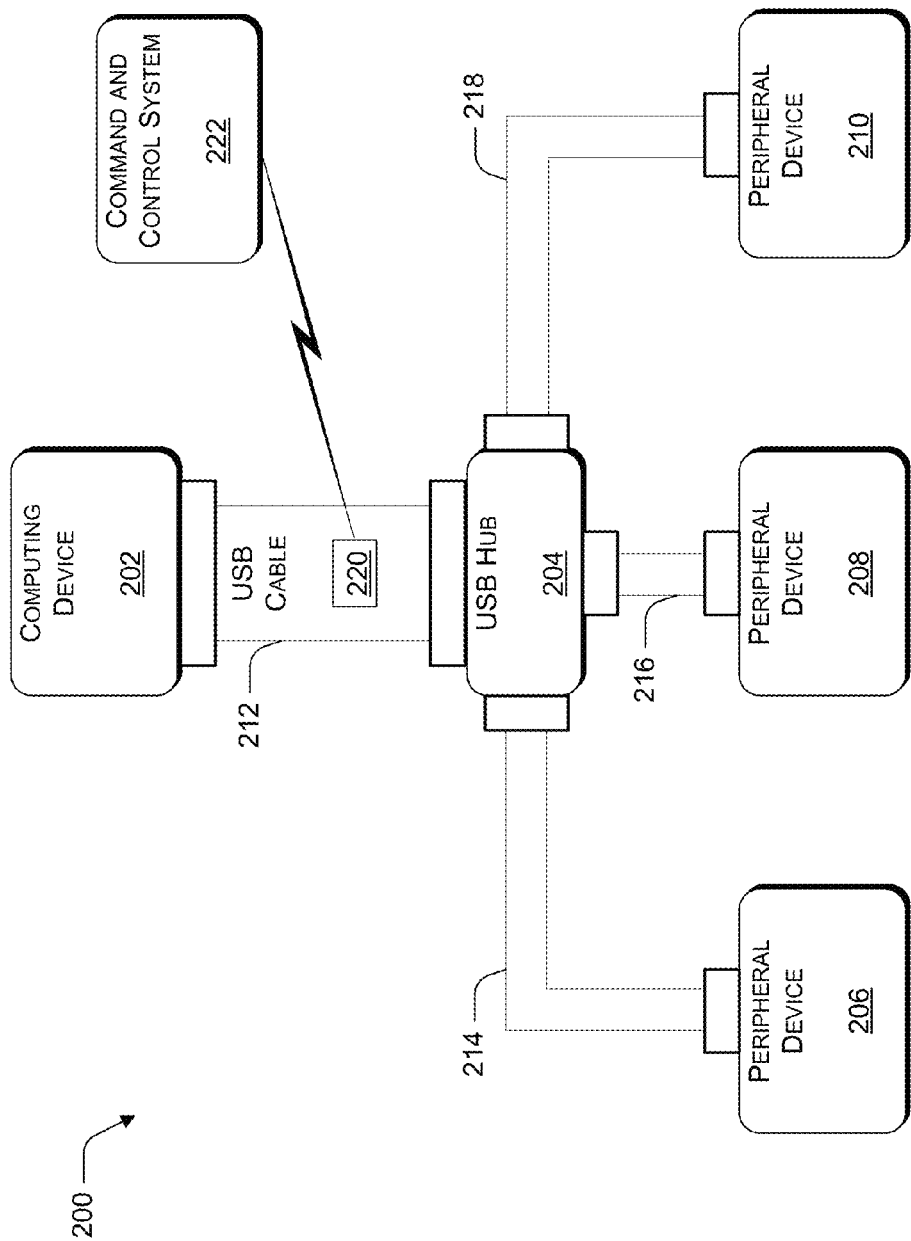
FIG. 2 is a block diagram illustrating an example environment in which an in-line network tap can be implemented as a universal serial bus (USB) Type C cable.

FIG. 2 illustrates an example environment 200 in which an in-line network tap can be implemented as a USB cable.

Example environment 200 includes a computing device 202, a USB hub 204, and any number of peripheral devices, such as peripheral devices 206, 208, and 210. In the illustrated example, computing device 202 is connected to the USB hub 204 using a USB cable 212. Peripheral devices 206, 208, and 210 are connected to the USB hub 204 using USB cables 214, 216, and 218, respectively. In an example, USB cable 212 is implemented as a USB Type-C cable, which supports the USB 3.1 standard and the USB power delivery standard. According to the USB power delivery standard, along with data, electrical power is transmitted through the USB cable 212, and the power delivery may be bi-directional.

Peripheral devices 206, 208, and 210 may represent any of a variety of devices including, but not limited to, a display device, a keyboard, a mouse, a printer, a memory stick, a blue ray player, a network interface, a smartphone, and so on. Furthermore, in another example, one or more peripheral devices may be connected to computing device 202 via a USB cable, without using a USB hub.

USB cable 212 includes network tap circuitry, such as network tap chip 220. Accordingly, USB cable 212 serves as an in-line network tap. Network tap chip 220 is powered by electrical power being transmitted through the USB cable 212 from any of the computing device 202, the USB hub 204, peripheral device 206, peripheral device 208, and/or peripheral device 210.

In the illustrated example, network tap chip 220 communicates with command and control system 222 to receive instructions and to provide monitoring and diagnostic data. In an example, network tap chip 220 includes a wireless network interface controller, which allows network tap chip 220 to communicate with command and control system 222 at least partly over a wireless network. For example, network tap chip 220 may connect to a remote command and control system 222 via any open Wi-Fi network or via a Wi-Fi network using previously supplied security credentials.

Figure 3:
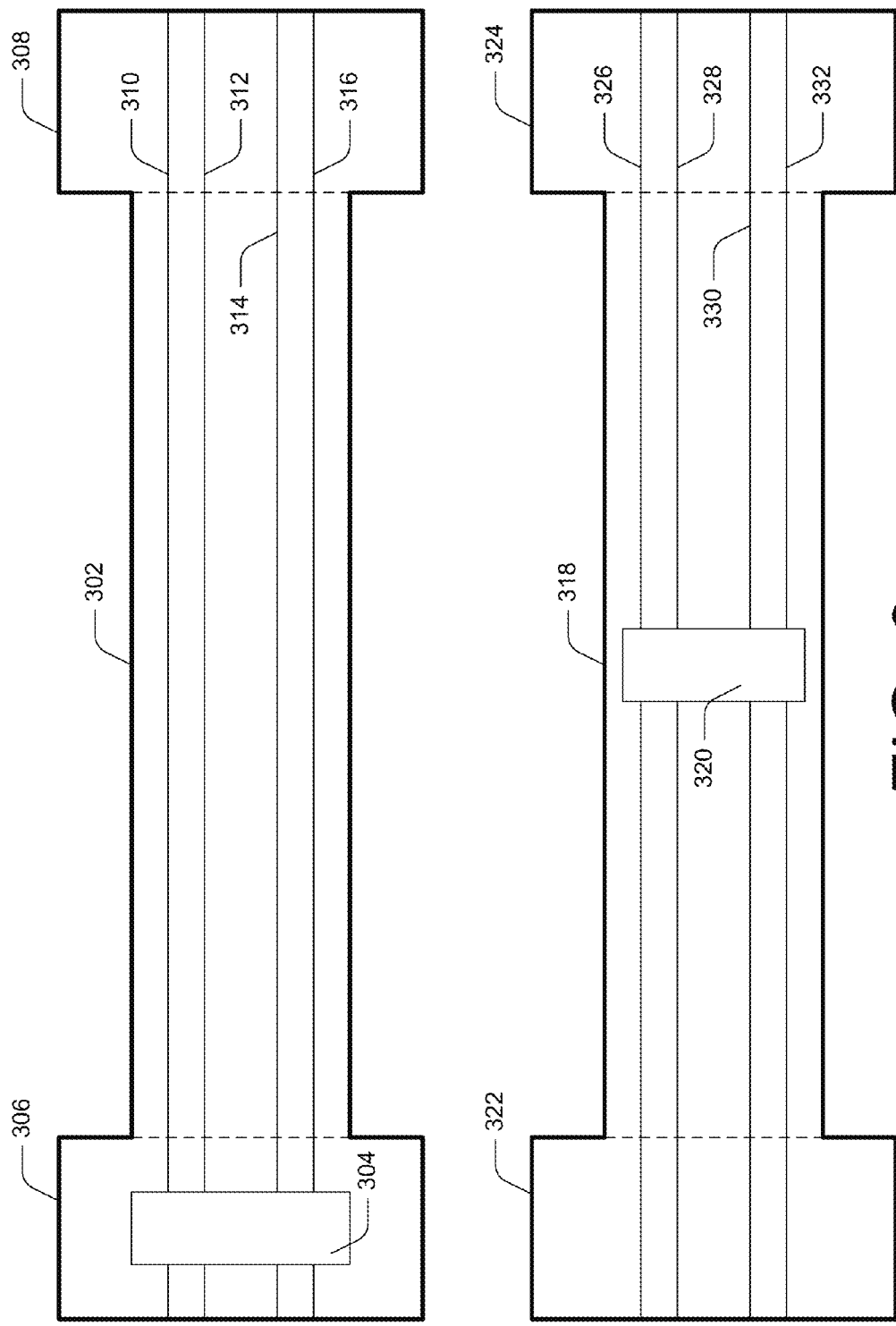
FIG. 3 is a pictorial diagram illustrating select components of an example in-line network tap.

FIG. 3 illustrates select components of an in-line network tap. As illustrated in FIG. 1 and FIG. 2, an in-line network tap can be implemented as a communication cable, such as, for example, an Ethernet cable, a USB cable, or any other type of communication cable over which data and power (e.g., electrical or optical) can be transmitted. The in-line network tap includes network tap circuitry such as a chip or printed circuit board, which, in the case of a cable implementation, can be incorporated within the cable or within a connector at an end of the cable.

The top portion of FIG. 3 illustrates a communication cable 302 in which the network tap circuitry 304 is implemented within a connector. The cable 302 includes a connector 306 at one end and a connector 308 at the other end. The cable also includes a plurality of wires. For example, FIG. 3 illustrates a cable that includes four wires. Two wires 310 and 312 for transmitting data in one direction, and two wires 314 and 316 for transmitting data in the other direction. The network tap circuitry 304 is embedded within the connector 306 such that each of the wires is connected to the network tap circuitry 304. In this way, data being transmitted over a particular wire can pass, uninterrupted, through the network tap circuitry 304.

As described above with reference to FIG. 1 and FIG. 2, electrical power is also transmitted over at least one wire within the cable 302. Network tap circuitry 304 receives power from at least one of the wires within the cable 302.

The bottom portion of FIG. 3 illustrates a communication cable 318 in which the network tap circuitry 320 is implemented within the protective covering of the wires of the cable. The cable 318 includes a connector 322 at one end and a connector 324 at the other end. The cable also includes a plurality of wires. For example, FIG. 3 illustrates a cable that includes four wires. Two wires 326 and 328 for transmitting data in one direction, and two wires 330 and 332 for transmitting data in the other direction. The network tap circuitry 320 is embedded within the protective coating of the wire such that each of the wires is connected to the network tap circuitry 320. In this way, data being transmitted over a particular wire can pass, uninterrupted, through the network tap chip circuitry. In an example, network tap circuitry 320 consists of a flexible or semi-flexible material to prevent damage to the circuitry when the wires and protective sheath are flexed.

As described above with reference to FIG. 1 and FIG. 2, electrical power is also transmitted over at least one wire within the cable 318. Network tap circuitry 320 receives power from at least one of the wires within the cable 318.

Cables 302 and 318 illustrate example placement of network tap circuitry within the physical structure of a cable. Either of cables 302 and 318 may correspond to cables 114 and 212 shown in FIG. 1 and FIG. 2, respectively.

To distinguish an in-line network tap cable from other Ethernet or USB cables, a label can be printed on the protective sheath covering the wires to indicate that the cable includes network tap circuitry. Furthermore, a connector that includes network tap circuitry may be color-coded or may include any other type of visual indicator to distinguish the connector from other connectors that do not include network tap circuitry.

Figure 4:
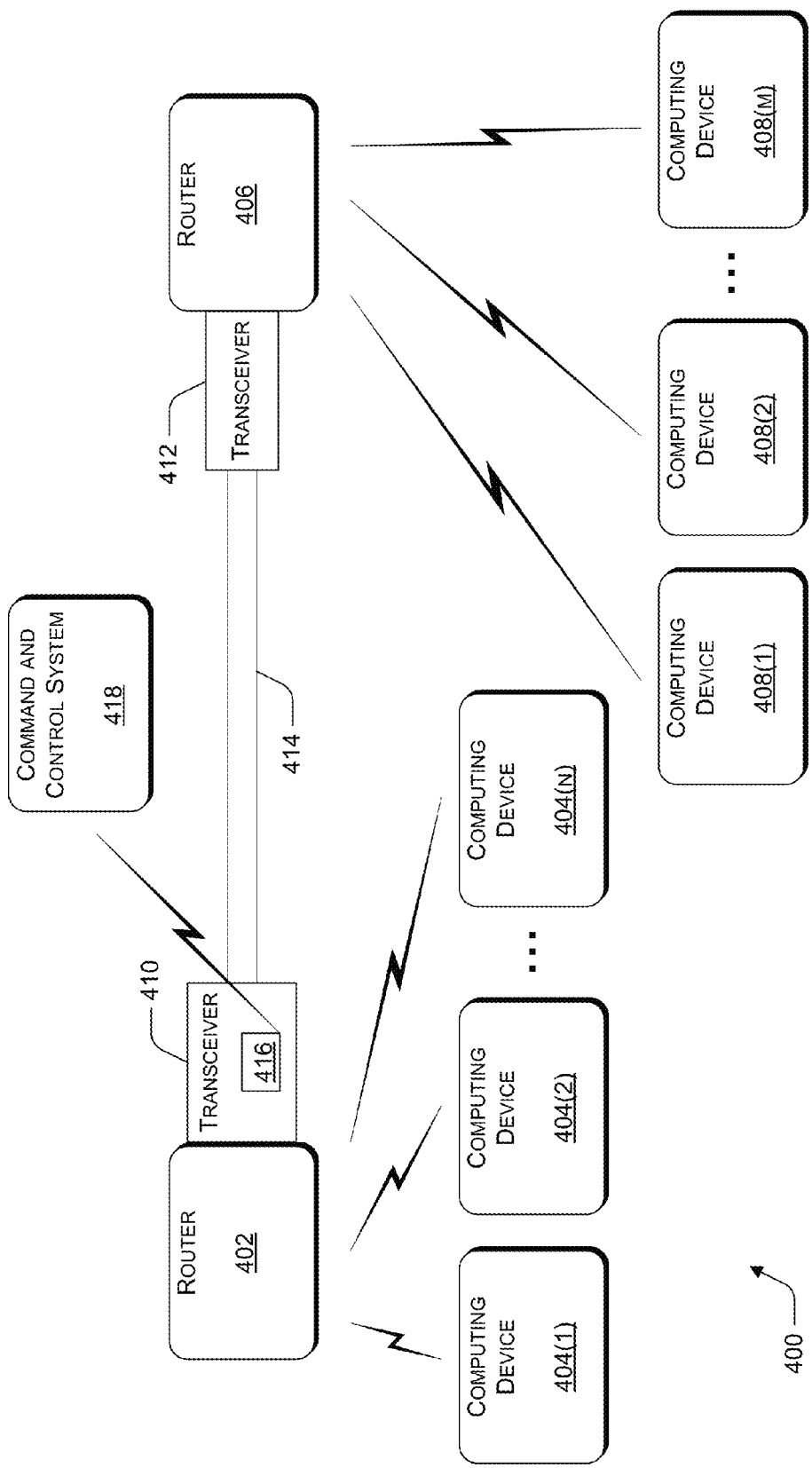
FIG. 4 is a block diagram illustrating an example environment in which an in-line network tap can be implemented as a transceiver.

FIG. 4 illustrates an example environment 400 in which an in-line network tap can be implemented as a transceiver. In the illustrated example, a router 402 is communicatively connected to any number of computing devices 404(1), 404(2) . . . 404(n). Similarly, another router 406 is communicatively connected to any number of computing devices 408(1), 408(2) . . . 408(m). A first transceiver 410, connected to router 402, and a second transceiver 412, connected to router 406 enable transmission and receipt of data between the first router 402 and the second router 406. Data can be communicated between transceiver 410 and transceiver 412 over any type of communication media 414 including, for example, fiber optic, copper, or wireless.

In the illustrated example, transceiver 410 includes network tap circuitry, such as a network tap chip 416, which allows transceiver 410 to function as an in-line network tap to monitor and diagnose data being transmitted between router 402 and router 406. The network tap chip receives electrical power from the router 402.

Figure 5:
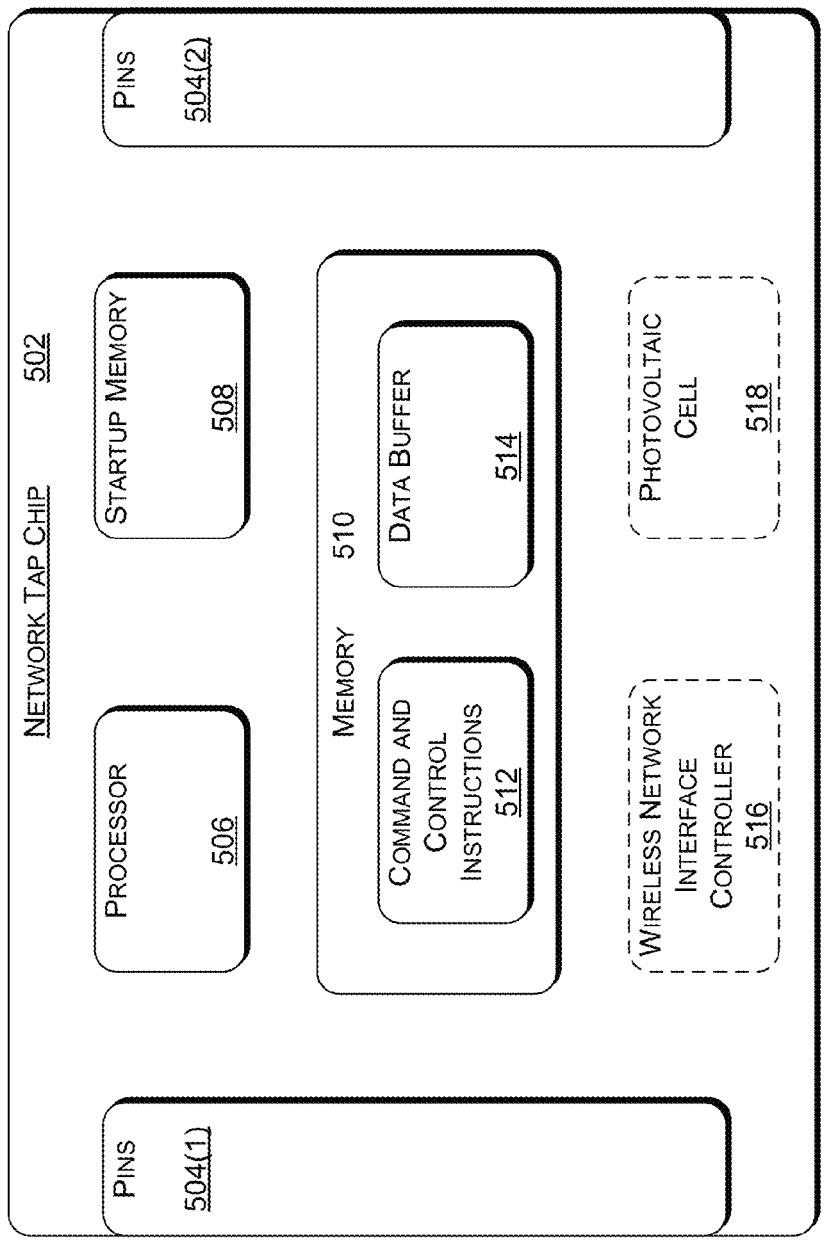
FIG. 5 is a block diagram illustrating select components of an example network tap chip.

In the illustrated example, network tap chip 416 communicates with command and control system 416 to receive instructions and to provide monitoring and diagnostic data. In an example, network tap chip 416 includes a wireless network interface controller, which allows network tap chip 416 to communicate with command and control system 416 at least partly over a wireless network. For example, network tap chip 416 may connect to a remote command and control system 418 via any open Wi-Fi network or via a Wi-Fi network using previously supplied security credentials FIG. 5 illustrates select components of an example network tap chip 502, which corresponds to network tap chips and circuitry 116, 220, 304, 320, and 416 shown in FIGS. 1-4, respectively. Example network tap chip 502 includes a first set of pins 504(1), and second set of pins 504(2), a processor 506, a startup memory 508, and memory 510.

Pins 504 provide connection points to the wires within a communication cable or transceiver. Startup memory 508 is implemented, for example, as flash memory to store initial startup data and instructions that are executed by the processor 506 when the network tap chip 502 begins receiving electrical power. Memory 510 includes, for example, command and control instructions 512 and a data buffer 514. As described above with reference to FIGS. 1, 2, and 4, network tap chip 502 may receive command and control instructions from a remote command and control system. Additionally, or alternatively, at least a portion of the command and control instructions may be pre-defined and stored in the memory 510. Data buffer provides short term storage for data packets being transmitted over a cable that includes the network tap chip, for example, when the receiving computing device is temporarily unable to receive the data packets.

Startup memory 508 and memory 510 may be implemented using any form of computer-readable media that is accessible by network tap chip 502. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Example network tap chip 502 may also include a wireless network interface controller 516, which is configured to enable the network tap chip 502 to communicate with the command and control system at least partly via a wireless network.

Furthermore, example network tap chip 502 may also include a photovoltaic cell 518. For example, if the network tap chip 502 is implemented within a fiber optic cable, the photovoltaic cell 518 can be configured to convert light received through the cable into electrical power to support the network tap chip functionality.

FIGS. 6-12 illustrate example processes for implementing an in-line network tap. The processes are illustrated as sets of operations shown as discrete blocks. The processes may be implemented in any suitable hardware, software, firmware, or combination thereof. The order in which the operations are described is not to be construed as a limitation.

Figure 6:
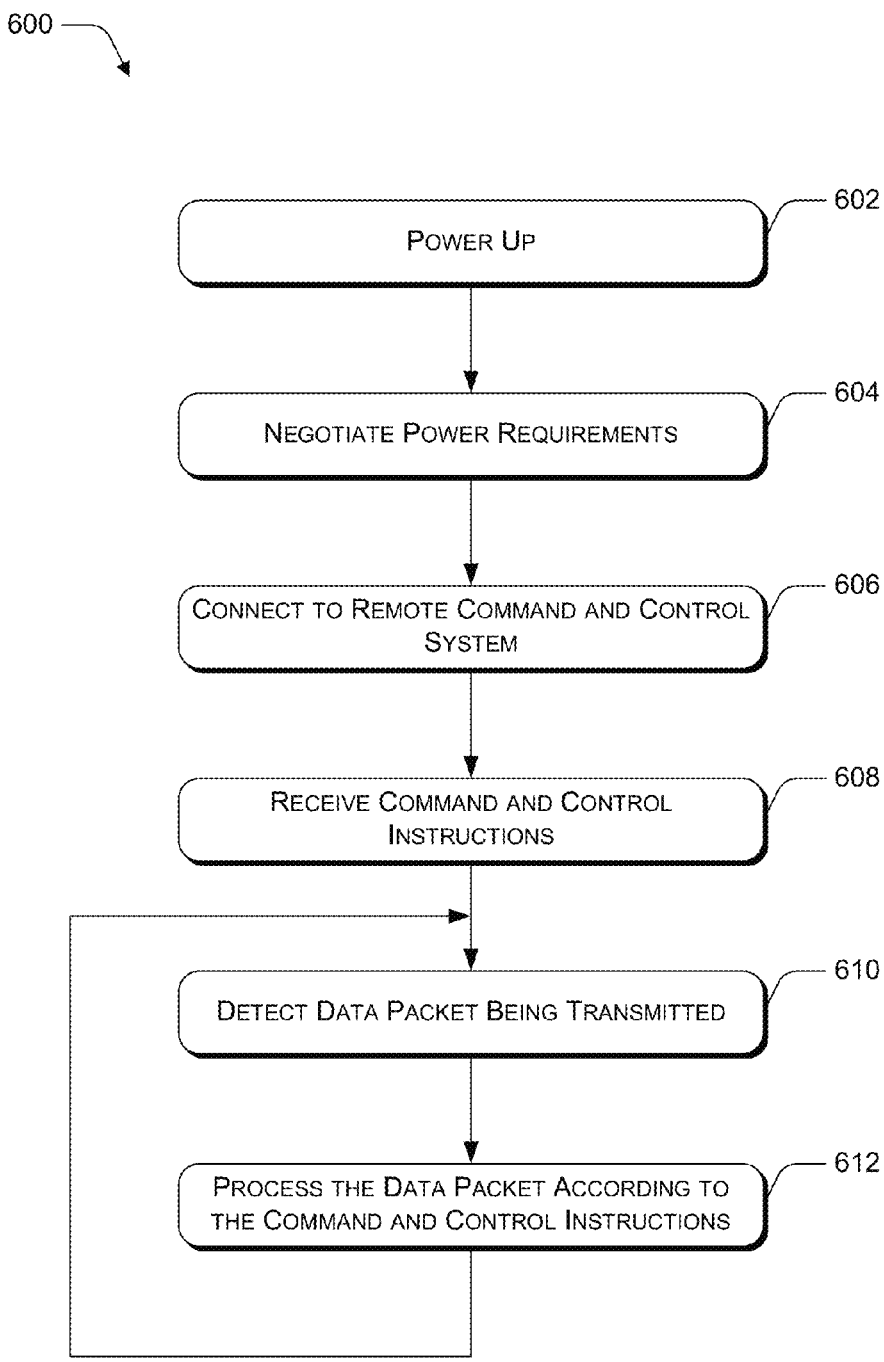
FIG. 6 is a flow diagram of an example method of implementing an in-line network tap.

FIG. 6 illustrates an example process 600 for processing network traffic using an in-line network tap.

At block 602, the in-line network tap powers up. For example, a network tap chip implemented within a communication cable, a cable connector, or a transceiver receives power through the wires connected to the network tap chip.

At block 604, the in-line network tap negotiates its power requirements. An example process for power negotiation is illustrated and described below with reference to FIG. 7.

At block 606, the in-line network tap connects to a remote command and control system. An example process for connecting to the remote command and control system is illustrated and described below with reference to FIG. 8.

At block 608, the in-line network tap receives command and control instructions from the remote command and control system. For example, the remote command and control system sends instructions via the communication connection established as described above with respect to block 606.

At block 610, the network tap chip detects a data packet being transmitted via the in-line network tap. For example, referring to the configuration illustrated in FIG. 1, the network tap chip 116 detects a data packet being transmitted from computing device 108 to PoE switch 102, or from PoE switch 102 to computing device 108.

As another example, referring to the configuration illustrated in FIG. 2, the network tap chip 220 detects a data packet being transmitted between the computing device 202 and a peripheral device 206, 208, or 210. As described above with reference to FIG. 2, peripheral devices 206, 208, and 210 may represent any of a variety of devices including, but not limited to, a display device, a keyboard, a mouse, a memory stick, a blue ray player, a network interface, a smartphone, and so on. Accordingly, the detected data packet could represent data being transmitted to or from any of these peripheral devices.

At block 612, the network tap chip processes the detected data packet according to the received command and control instructions. For example, the network tap chip may process a detected data packet in support of intrusion detection and prevention, improved data transmission, troubleshooting, and/or network performance monitoring. See further details described below with reference to FIGS. 9-12.

Figure 7:
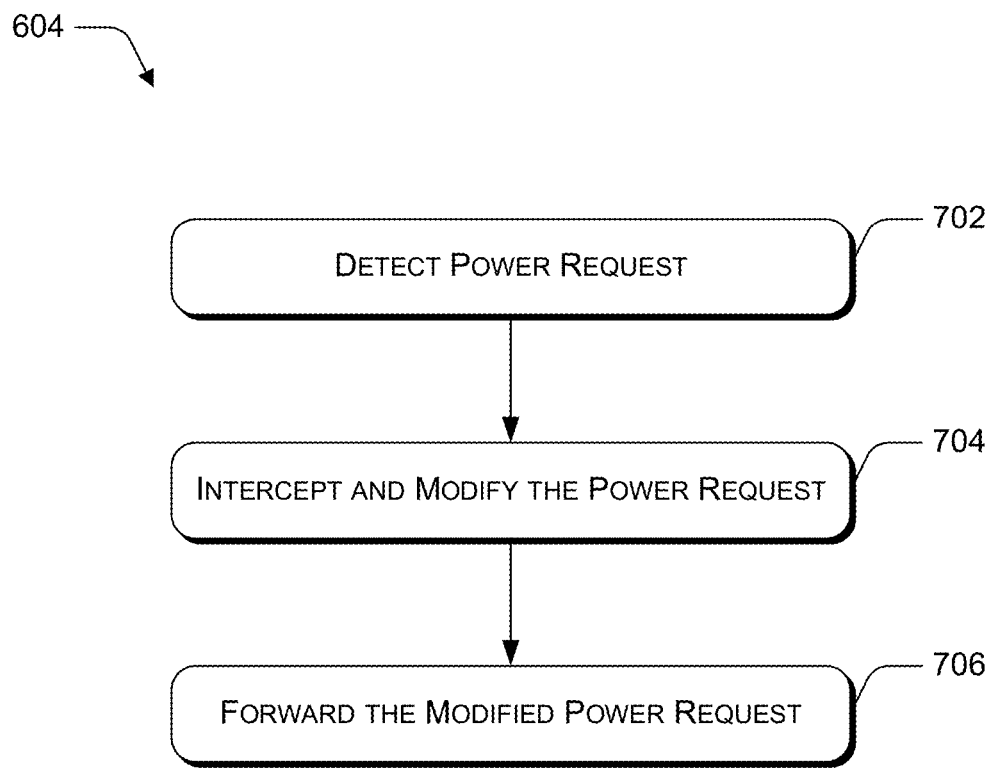
FIG. 7 is a flow diagram of an example method of power negotiation for an in-line network tap.

FIG. 7 illustrates an example process 604 for power negotiation. In an example implementation, when the network tap chip begins receiving power through the wires connected to the network tap chip, the network tap chip powers up, as described above with reference to FIG. 6. The network tap chip may then participate in power negotiation to ensure that the network tap chip receives sufficient power from a device to which the in-line network tap is connected.

At block 702, the network tap chip detects a power request. For example, in a PoE network as shown in FIG. 1, the in-line network tap 114 is implemented between the PoE switch 102 and a computing device 108. The PoE configuration enables the computing device 108 to request power from the PoE switch. In an example implementation, the network tap chip 116 detects a power request being transmitted from the computing device 108 to the PoE switch.

At block 704, the network tap chip intercepts and modifies the power request. For example, the power request being transmitted from the computing device 108 to the PoE switch 102 may specify an amount of power the computing device is requesting. Network tap chip 116 increases the power request by an amount equal to the power required to run the network tap chip. If the computing device does not request any power from the PoE switch, the network tap chip may add a power request to a data transmission from the computing device to the PoE switch.

At block 706, the network tap chip forwards the data packet including the modified power request to the intended recipient. For example, network tap chip 116 forwards the data packet on to the PoE switch.

Power negotiation in a USB implementation is similar to that described above with reference to the PoE implementation.

Alternatively, a signal being transmitted over an in-line network tap may include excess power that is sufficient to power the network tap chip. If this is the case, power negotiation may not be performed.

Figure 8:
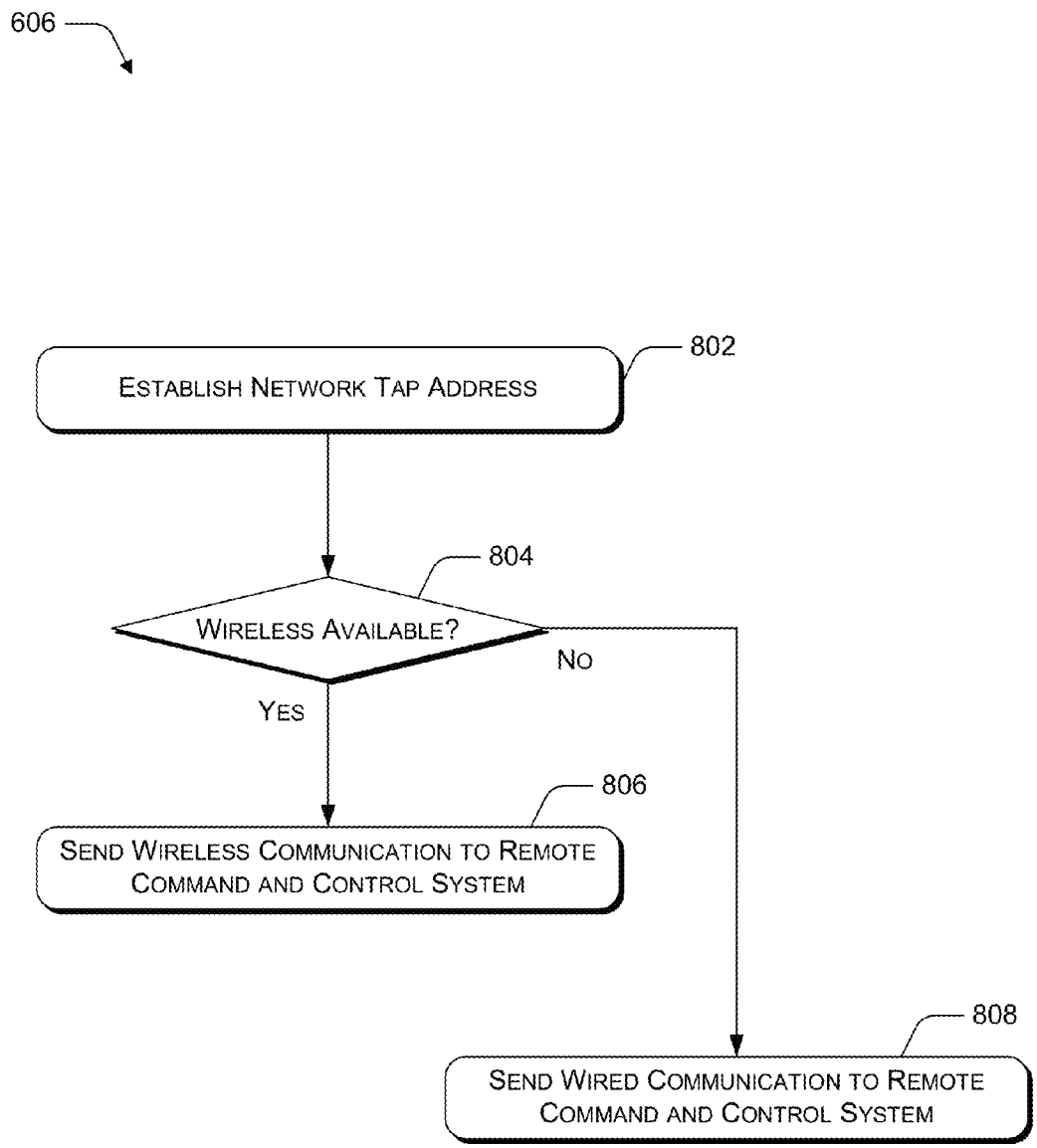
FIG. 8 is a flow diagram of an example method of establishing communication between an in-line network tap and a remote command and control system.

FIG. 8 illustrates an example process 606 for connecting to a remote command and control system.

At block 802, the network tap chip establishes an address for the network tap chip. For example, the network tap chip monitors data transmissions over the in-line network tap, and determines the MAC address and the IP address of a computing device to which the in-line network tap is connected. For example, the MAC address and the IP address of the sending device may be extracted from the header of a data packet being transmitted over the in-line network tap. The network tap chip then assigns itself the same MAC address and IP address as the computing device to which the in-line network tap is connected.

By using the same MAC address and IP address as the computing device to which the in-line network tap is connected, data transmissions from the network tap chip will not be blocked by MAC address locking or IP address locking.

In another example, the network tap chip may submit a Dynamic Host Configuration Protocol (DHCP) request to request an IP address.

At block 804, the network tap chip determines whether or not a wireless network is available. For example, wireless network interface controller 516 searches for an available wireless access point.

If a wireless network is available (the "Yes" branch from block 804), then at block 806, the network tap chip sends a wireless communication to the remote command and control system based on, for example, a predefined static IP address or domain name (with the associated DNS lookup after booting up) that is preconfigured in the network tap chip.

If no wireless network is available, or if the network tap chip is not equipped with a wireless network interface controller (the "No" branch from block 804), then at block 808, the network tap chip sends a wired communication to the remote command and control system based on, for example, a predefined static IP address or domain name that is preconfigured in the network tap chip. For example, in the configuration illustrated in FIG. 1, the network tap chip sends the wired communication via the PoE switch 102.

Figure 9:
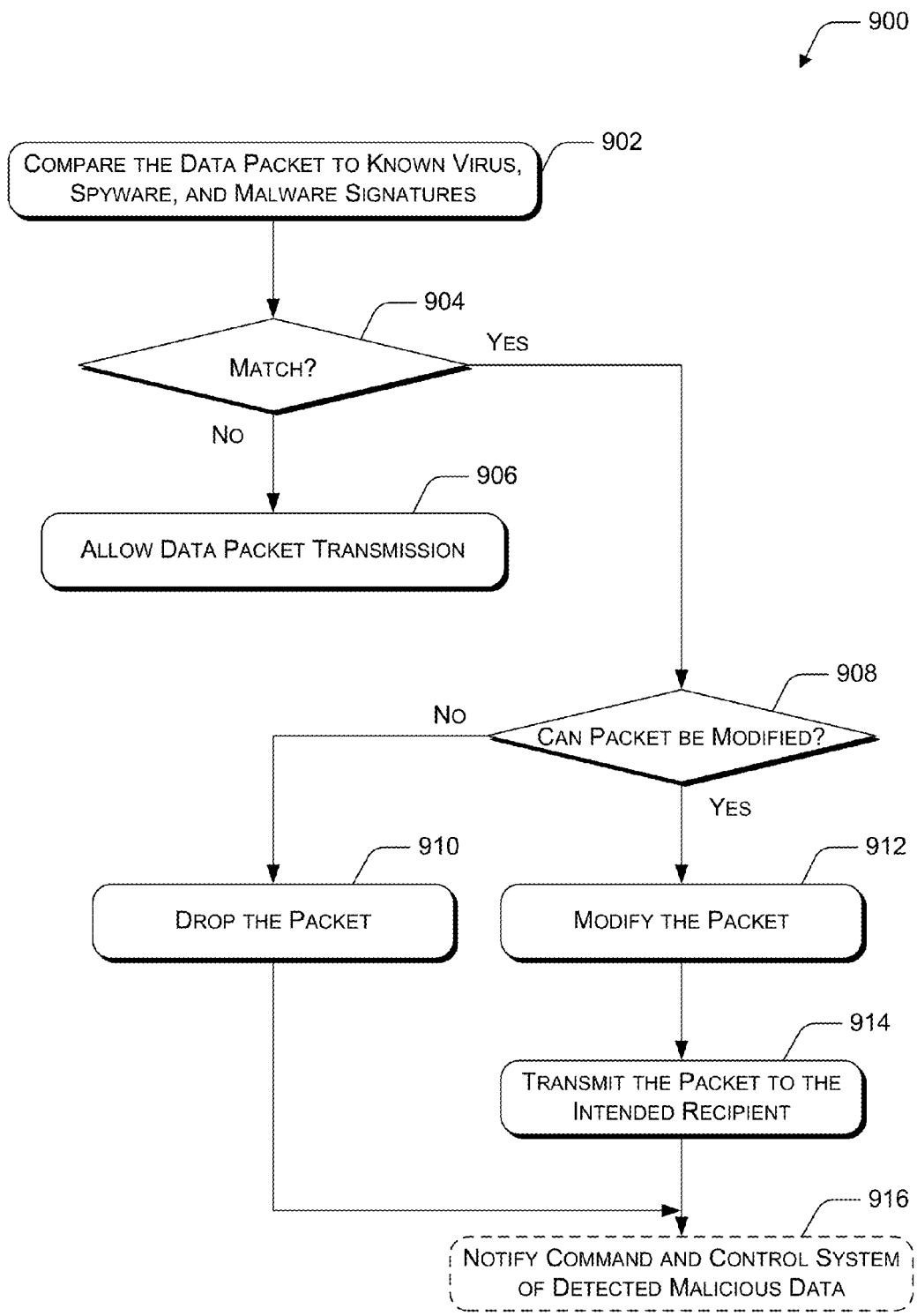
FIG. 9 is a flow diagram of an example method of intrusion detection and prevention using an in-line network tap.

FIG. 9 illustrates a process for using the in-line network tap for intrusion detection and prevention. The process illustrated in FIG. 9 can be performed as part of the processing represented at block 612 of FIG. 6.

At block 902, the detected data packet is compared to known virus, spyware, and malware signatures. For example, the network tap chip compares the detected packet to virus, spyware, and malware signatures received from the command and control center, as described above with reference to block 608.

At block 904, the network tap chip determines whether or not the detected data packet matches any of the known virus, spyware, or malware signatures.

If the detected data packet does not match any of the known virus, spyware, or malware signatures (the "No" branch from block 904), then at block 906, the network tap chip allows the detected data packet to be transmitted as intended.

On the other hand if the detected data packet matches a known virus, spyware, or malware signature (the "Yes" branch from block 904), then at block 908, the network tap chip determines whether or not the detected data packet can be modified to remove the malicious content.

If the network tap chip determines that the detected packet can not be modified (the "No" branch from block 908), then at block 910, the network tap chip prevents the detected data packet from being transmitted to the intended recipient. For example, the network tap chip may discard the detected packet.

On the other hand, if the network tap chip determines that the detected packet can be modified (the "Yes" branch from block 908), then at block 912, the network tap chip modifies the packet, for example, to remove a portion of the data that matches a virus, spyware, or malware signature. At block 914, the network tap chip transmits the modified packet to the intended recipient of the packet.

In addition to dropping or modifying the detected packet, optionally, at block 916, the network tap chip may notify the command and control system of the detected malicious data packet.

The process illustrated in FIG. 9 is an improvement over existing anti-virus detection techniques in that the malicious data is identified and discarded before it reaches its intended target. For example, referring to FIG. 2, if peripheral device 206 is a memory stick holding malicious code, when the data is transmitted over the USB cable 212 toward the computing device 202, the malicious data is detected and discarded or modified by network tap chip 220 before the malicious data reaches the computing device 202. In contrast, existing anti-virus systems require a virus scanning application to be installed on the computing device to periodically scan for malicious code that has made its way into the computing device.

Figure 10:
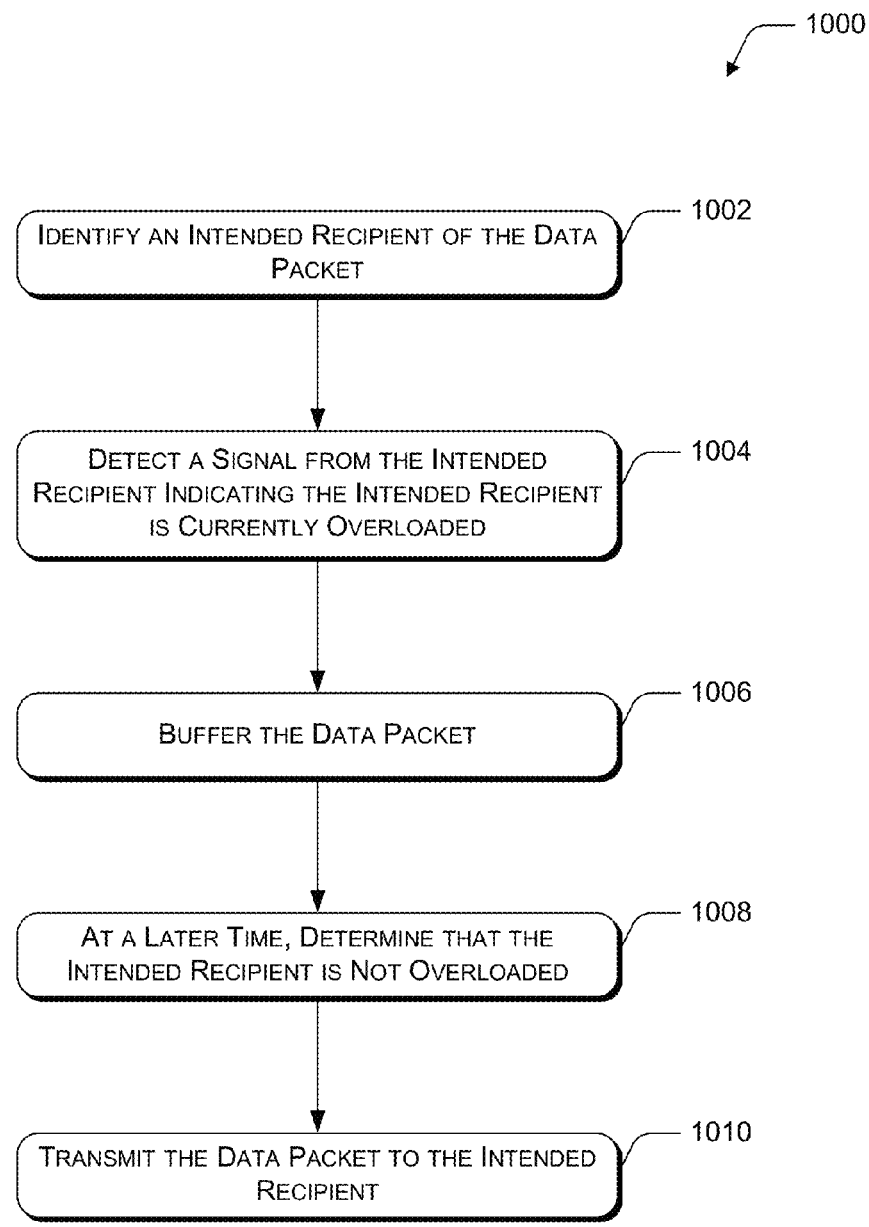
FIG. 10 is a flow diagram of an example method of improving data transmission using an in-line network tap.

FIG. 10 illustrates a process for using the in-line network tap to improve data delivery. The process illustrated in FIG. 10 can be performed as part of the processing represented at block 612 of FIG. 6.

At block 1002, an intended recipient of the detected data packet is identified. For example, the network tap chip examines the packet header data to determine the intended recipient.

At block 1004, the network tap chip detects a signal from the intended recipient indicating that the intended recipient is currently unable to receive the data packet. For example, the network tap chip may detect a TCP zero window message from the intended recipient.

At block 1006, the network tap chip buffers the data packet for later transmission to the intended recipient.

At block 1008, the network tap chip determines that the intended recipient is no longer overloaded. For example, the network tap chip determines that the TCP window size for the intended recipient is no longer set to zero.

At block 1010, the network tap chip transmits the data packet to the intended recipient.

The process illustrated in FIG. 10 improves data delivery by providing an intermediate buffer when a recipient is temporarily unable to receive data. This prevents the sender from receiving an error message and having to re-send the data packets.

Figure 11:
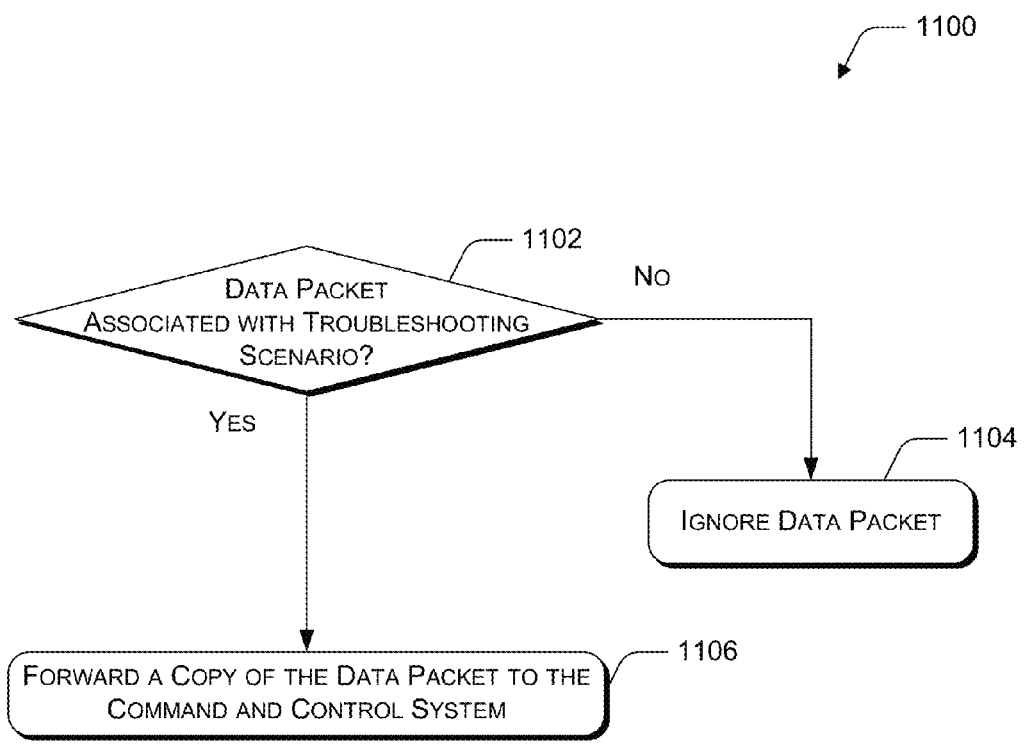
FIG. 11 is a flow diagram of an example method of troubleshooting using an in-line network tap.

FIG. 11 illustrates a process for using the in-line network tap to enable remote troubleshooting. The process illustrated in FIG. 11 can be performed as part of the processing represented at block 612 of FIG. 6.

At block 1102, the network tap chip determines whether or not the detected data packet is associated with a troubleshooting scenario. For example, referring to FIG. 2, a user of computing device 202 may contact an administrator associated with the command and control system 222, indicating that the user is having some sort of a problem with the computing device 202. Command and control system 222 sends instructions to network tap chip 220, identifying types of data to be associated with a troubleshooting scenario. For example, the troubleshooting scenario information may be received by the network tap chip 220 according to block 608 of FIG. 6.

When the network tap chip detects a data packet (block 610 of FIG. 6), the network tap chip compares header information of the packet to the troubleshooting scenario to determine whether or not the data packet is associated with the troubleshooting scenario. For example, a particular troubleshooting scenario may specify that data packets received from a keyboard or a mouse are to be included in the troubleshooting scenario.

If the detected data packet is not associated with the troubleshooting scenario (the "No" branch from block 1102), then at block 1104, the data packet is ignored. For example, given the example scenario described above, if the detected data packet is received from the computing device or from a peripheral device other than a mouse or keyboard, then the network tap chip ignores the detected data packet, allowing the detected data packet to proceed with normal transmission.

On the other hand, if the detected data packet is associated with the troubleshooting scenario (the "Yes" branch from block 1102), then at block 1106, a copy of the data packet is forwarded to the command and control system. For example, given the example scenario described above, if the detected data packet is being transmitted from a mouse or a keyboard, the network tap chip generates a copy of the data packet and transmits the copy to the command and control system.

The process illustrated in FIG. 11 enables remote troubleshooting without requiring that the administrator be given full access to the computing device that is being examined, which can cause security concerns.

Figure 12:
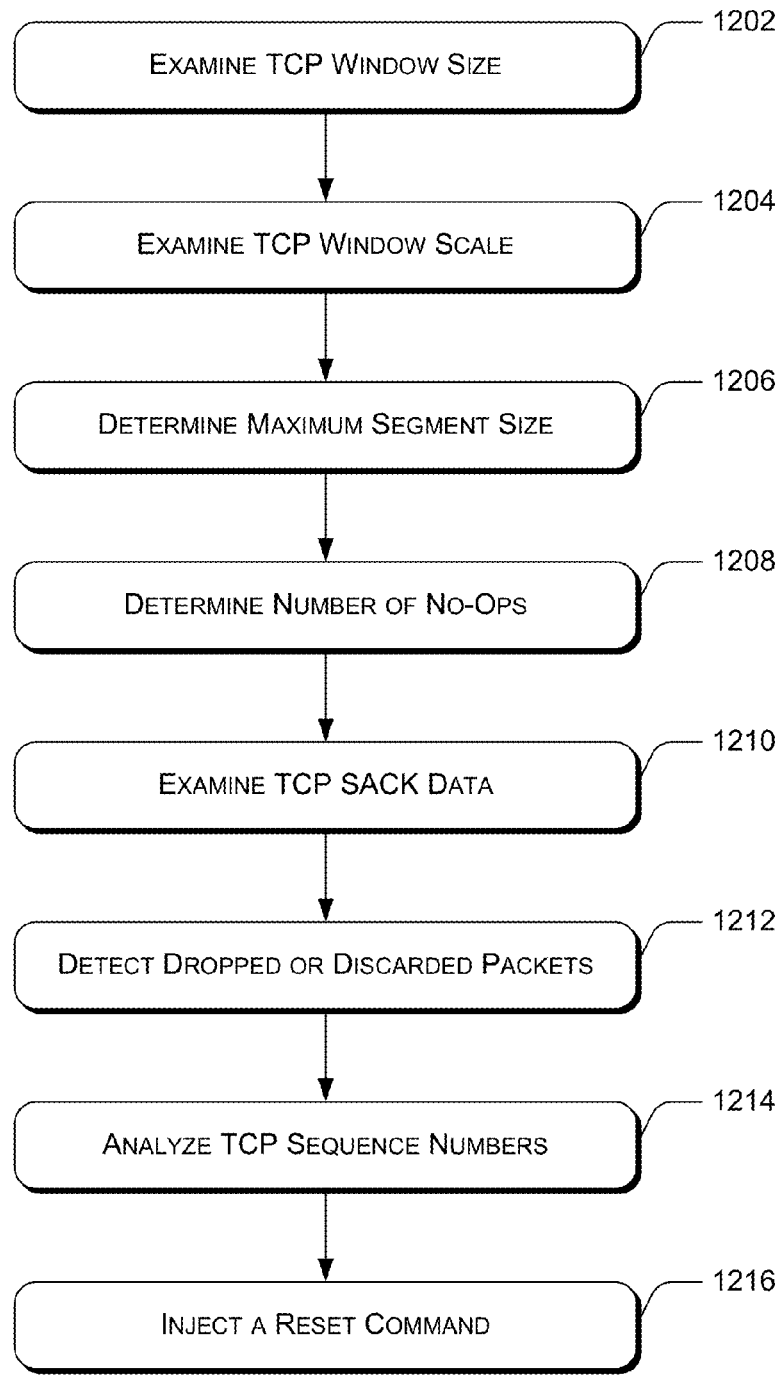
FIG. 12 is a flow diagram of an example method of monitoring network performance using an in-line network tap.

FIG. 12 illustrates an example process for using an in-line network tap to monitor network performance. The in-line network tap can continuously monitor network traffic to quickly identify, and possibly address, network problems. For example, data associated with TCP layers 1-4 can be used to identify various potential network issues. FIG. 12 provides examples for monitoring network performance using an in-line network tap.

At block 1202, network tap chip 502 examines a TCP window size value.

At block 1204, network tap chip 502 examines a TCP window scale value. The TCP window size and TCP window scale values indicate an amount of data that a device is currently able to receive. As the network tap chip 502 monitors TCP window size values and TCP window scale values, network bottlenecks can be identified.

At block 1206, network tap chip 502 determines a maximum segment size. By monitoring the maximum segment size, network tap chip 502 may identify, for example, situations in which a network address translation (NAT) device such as a firewall, VPN tunnel, etc., is between the sender and the receiver.

At block 1208, network tap chip 502 determines a number of no operations indicators (no-ops). For example, more than four no-ops may indicate another device is in the path between the sender and the receiver.

At block 1210, network tap chip 502 examines TCP selective acknowledgement (SACK) data. TCP SACK allows selective retransmission of specific packets. As an example, frequently needing to retransmit data may be an indicator of a problem with the network.

At block 1212, network tap chip 502 detects dropped or discarded packets.

At block 1214, network tap chip 502 analyzes TCP sequence numbers. By analyzing TCP sequence numbers the network tap chip can determine which data has been received and which data is still missing.

At block 1216, network tap chip 502 injects a reset command. For example, if the network tap chip determines that a particular device is not functioning well, the network tap chip can issue a reset command directed to the particular device.

Using an in-line network tap to monitor network performance provides advantages over traditional network taps. For example, an in-line network tap can be configured as an active network tap, that is able to prevent malicious data from being transmitted, or inject additional data such as a reset command.

EXAMPLE CLAUSES

Paragraph A: An in-line network tap cable comprising: a plurality of wires between a first device and a second device; a protective sheath that surrounds the plurality of wires; a first connector at a first end of the plurality of wires, to connect the in-line network tap cable to the first device; a second connector at a second end of the plurality of wires, to connect the in-line network tap cable to the second device;

and network tap circuitry connected to the plurality of wires to monitor data being transmitted over the in-line network tap cable.

Paragraph B: An in-line network tap cable as Paragraph A recites, wherein the network tap circuitry is implemented as a computer chip.

Paragraph C: An in-line network tap cable as Paragraph A recites, wherein the network tap circuitry is implemented as a printed circuit board.

Paragraph D: An in-line network tap cable as any of Paragraphs A-C recite, wherein the network tap circuitry is configured to receive power from the first device and through one or more wires of the plurality of wires.

Paragraph E: An in-line network tap cable as any of Paragraphs A-D recite, wherein the network tap circuitry is attached to the plurality of wires within the first connector.

Paragraph F: An in-line network tap cable as any of Paragraphs A-D recite, wherein the network tap circuitry is attached to the plurality of wires within the protective sheath.

Paragraph G: An in-line network tap cable as any of Paragraphs A-F recite, implemented as an Ethernet cable, wherein the first device comprises a power over Ethernet switch.

Paragraph H: An in-line network tap cable as any of Paragraphs A-F recite, implemented as a universal serial bus (USB) cable.

Paragraph I: An in-line network tap cable as any of Paragraphs A-F recite, implemented as a universal serial bus (USB) Type-C cable.

Paragraph J: An in-line network tap cable as any of Paragraphs A-I recite, wherein the network tap circuitry comprises: a processor; startup memory communicatively coupled to the processor and configured to boot up the network tap circuitry upon receipt of power; and memory communicatively coupled to the processor and configured to store command and control instructions for execution by the processor to process data packets being transmitted through the in-line network tap cable.

Paragraph K: An in-line network tap cable as any of Paragraphs A-J recite, wherein the network tap circuitry comprises a wireless network interface controller.

Paragraph L: An in-line network tap cable as any of Paragraphs A-K recite, wherein the network tap circuitry comprises memory configured to buffer data being transmitted via the in-line network tap cable.

Paragraph M: A network tap circuit device comprising: a processor; startup memory communicatively coupled to the processor and configured to boot up the network tap circuit upon receipt of power; and memory communicatively coupled to the processor and configured to store command and control instructions for execution by the processor to process data packets being transmitted through the network tap circuit device.

Paragraph N: A network tap circuit device as Paragraph M recites, further comprising a wireless network interface controller configured to enable the network tap circuit device to communicate over a wireless network to receive command and control instructions from a remote command and control system.

Paragraph O: A network tap circuit device as Paragraph M or Paragraph N recites, wherein the network tap circuit device is physically embedded within a connector, wherein the connector is configured to attach to an end of a communication cable to connect the communication cable to a computing device.

Paragraph P: A network tap circuit device as Paragraph O recites, wherein the connector is an Ethernet connector.

Paragraph Q: A network tap circuit device as Paragraph O recites, wherein the connector is a universal serial bus (USB) connector.

Paragraph R: A network tap circuit device as Paragraph O recites, wherein the connector is a universal serial bus (USB) Type-C connector.

Paragraph S: A network tap circuit device as Paragraph M or Paragraph N recites, wherein the network tap circuit device is physically embedded within a transceiver.

Paragraph T: A network tap circuit device as any of Paragraphs M-S recite, wherein the network tap circuit device comprises a computer chip.

Paragraph U: A network tap circuit device as any of Paragraphs M-S recite, wherein the network tap circuit device comprises a printed circuit board.

Paragraph V: A method comprising: receiving, by an in-line network tap, command and control instructions, wherein the in-line network tap comprises network tap circuitry physically embedded within a communications cable or a transceiver within a network; detecting, by the in-line network tap, a data packet being transmitted from a first device to a second device via the communications cable or transceiver; and processing, by the in-line network tap, the data packet according to the command and control instructions.

Paragraph W: A method as Paragraph V recites, wherein the in-line network tap is connect to the first device, the method further comprising: determining an address associated with the first device; and assigning as an address of the in-line network tap, the address associated with the first device so that communications originating from the in-line network tap appear to originate from the first device.

Paragraph X: A method as Paragraph W recites, wherein the address is an Internet Protocol (IP) address.

Paragraph Y: A method as Paragraph W recites, wherein the address is a Media Access Control (MAC) address.

Paragraph Z: A method as any of Paragraphs V-Y recite, further comprising detecting a signal from the second device, the signal indicating that the second device is unable to receive the data packet, wherein the processing comprises: buffering, by the in-line network tap, the data packet being transmitted from the first device to the second device; and at a later time, sending, by the in-line network tap, the buffered data packet to the second device.

Paragraph AA: A method as any of Paragraphs V-Y recite, wherein the processing comprises: determining that the data packet is malicious; and at least partly based on the determining, preventing the data packet from being delivered to the second device.

Paragraph AB: A method as any of Paragraphs V-Y recite, wherein the processing comprises: determining that the data packet is malicious; and at least partly based on the determining: modifying the data packet; and transmitting the modified data packet to the second device.

Paragraph AC: A method as any of Paragraphs V-Y recite, wherein the processing comprises: determining that the data packet is associated with a troubleshooting scenario; and at least partly based on the determining, transmitting a copy of the data packet to a remote command and control system.

Paragraph AD: A method as any of Paragraphs V-Y recite, wherein the processing comprises examining header data associated with the data packet to identify network performance issues.

CONCLUSION

Although an example in-line network tap, and use thereof, has been described in language specific to structural features and/or methodological steps, it is to be understood that an in-line network tap, and use thereof, as defined in the appended claims is not necessarily limited to the specific features or steps described above. Rather, the specific features and steps described above are disclosed as examples of implementing the claims and other equivalent features and steps are intended to be within the scope of the claims.

The invention claimed is:

1. An in-line network tap cable comprising:
   a plurality of wires between a first device and a second device;
   a protective sheath that surrounds the plurality of wires;
   a first connector at a first end of the plurality of wires, to connect the in-line network tap cable to the first device;
   a second connector at a second end of the plurality of wires, to connect the in-line network tap cable to the second device; and
   network tap circuitry connected within the in-line network tap cable to the plurality of wires to monitor data being transmitted over the in-line network tap cable, wherein the network tap circuitry is configured to receive power from the first device and through one or more wires of the plurality of wires.

2. An in-line network tap cable as recited in claim 1, wherein the network tap circuitry is attached, within the first connector, to the plurality of wires.

3. An in-line network tap cable as recited in claim 1, wherein the network tap circuitry is attached, within the protective sheath, to the plurality of wires.

4. An in-line network tap cable as recited in claim 1, implemented as an Ethernet cable, wherein the first device comprises a power over Ethernet switch.

5. An in-line network tap cable as recited in claim 1, implemented as a universal serial bus (USB) cable.

6. An in-line network tap cable as recited in claim 1, implemented as a universal serial bus (USB) Type-C cable.

7. An in-line network tap cable as recited in claim 1, wherein the network tap circuitry comprises:
   a processor;
   startup memory communicatively coupled to the processor and configured to boot up the network tap circuitry upon receipt of power; and
   memory communicatively coupled to the processor and configured to store command and control instructions for execution by the processor to process data packets being transmitted through the in-line network tap cable.

8. An in-line network tap cable as recited in claim 1, wherein the network tap circuitry comprises a wireless network interface controller.

9. An in-line network tap cable as recited in claim 1, wherein the network tap circuitry comprises memory configured to buffer data being transmitted via the in-line network tap cable.

10. A network tap circuit configured to connect to a device, the network tap circuit comprising:
    a processor;
    startup memory communicatively coupled to the processor and configured to boot up the network tap circuit upon receipt of power from the device; and
    memory communicatively coupled to the processor and configured to store command and control instructions for execution by the processor to process data packets being transmitted through the network tap circuit,
    wherein the network tap circuit is physically embedded within a connector of a communication cable, wherein the connector is configured to attach an end of the communication cable to the device.

11. A network tap circuit as recited in claim 10, further comprising a wireless network interface controller configured to enable the network tap circuit device to communicate over a wireless network to receive command and control instructions from a remote command and control system.

12. A network tap circuit as recited in claim 10, wherein: the device is a computing device.

13. A network tap circuit as recited in claim 12, wherein the connector is an Ethernet connector.

14. A network tap circuit as recited in claim 10, wherein:
    the device is a router; and
    the network tap circuit is physically embedded within a transceiver, the transceiver being configured to connect to the router.

15. A method comprising:
    receiving, by an in-line network tap, command and control instructions, wherein the in-line network tap comprises network tap circuitry physically embedded within a communications cable or a transceiver and connected to a first device within a network, wherein the communications cable or the transceiver is configured to enable communication between a first device and a second device and wherein the in-line network tap obtains power from the first device through one or more wires in the communications cable or transceiver;
    detecting, by the in-line network tap, a data packet being transmitted from the first device to the second device via the communications cable or the transceiver; and
    processing, by the in-line network tap, the data packet according to the command and control instructions.

16. A method as recited in claim 15, further comprising detecting a signal from the second device, the signal indicating that the second device is unable to receive the data packet, wherein the processing comprises:
    buffering, by the in-line network tap, the data packet being transmitted from the first device to the second device; and
    at a later time, sending, by the in-line network tap, the buffered data packet to the second device.

17. A method as recited in claim 15, wherein the processing comprises:
    determining that the data packet is malicious; and
    at least partly based on the determining, preventing the data packet from being delivered to the second device.

18. A method as recited in claim 15, wherein the processing comprises:
    determining that the data packet is associated with a troubleshooting scenario; and
    at least partly based on the determining, transmitting a copy of the data packet to a remote command and control system.

19. A method as recited in claim 15, wherein the processing comprises examining header data associated with the data packet to identify network performance issues.

* * * * *